US012562934B2

(12) United States Patent
Xue et al.

(10) Patent No.: US 12,562,934 B2
(45) Date of Patent: Feb. 24, 2026

(54) METHOD AND APPARATUS FOR BINDING PLURALITY OF ELECTRICAL DEVICES AND COMPUTER-READABLE STORAGE MEDIUM

(71) Applicant: Wuxi Little Swan Electric Co., Ltd., Wuxi (CN)

(72) Inventors: Chenxi Xue, Wuxi (CN); Mingfu Jin, Wuxi (CN)

(73) Assignee: Wuxi Little Swan Electric Co., Ltd., Wuxi (CN)

( * ) Notice: Subject to any disclaimer, the term of this patent is extended or adjusted under 35 U.S.C. 154(b) by 101 days.

(21) Appl. No.: 18/578,580

(22) PCT Filed: Aug. 25, 2023

(86) PCT No.: PCT/CN2023/114954
§ 371 (c)(1),
(2) Date: Jan. 11, 2024

(87) PCT Pub. No.: WO2024/041640
PCT Pub. Date: Feb. 29, 2024

(65) Prior Publication Data
US 2025/0125988 A1 Apr. 17, 2025

(30) Foreign Application Priority Data
Aug. 25, 2022 (CN) .......................... 202211028563.2

(51) Int. Cl.
H04L 12/28 (2006.01)
G06F 21/73 (2013.01)
(Continued)

(52) U.S. Cl.
CPC ...... *H04L 12/2809* (2013.01); *H04L 63/0428* (2013.01)

(58) Field of Classification Search
CPC . H04L 12/2809; H04L 12/12; H04L 12/2803; H04L 63/0428; H04L 63/104;
(Continued)

(56) References Cited

U.S. PATENT DOCUMENTS

| 2007/0220614 A1* | 9/2007 | Ellis | ...................... G06F 21/645 |
| | | | 726/27 |
| 2008/0224834 A1* | 9/2008 | Oosaka | ............... H04L 12/2803 |
| | | | 340/286.02 |

(Continued)

FOREIGN PATENT DOCUMENTS

| CN | 104780154 A | * | 7/2015 | ........... H04L 67/141 |
| CN | 106059837 A | | 10/2016 | |

(Continued)

OTHER PUBLICATIONS

The European Patent Office (EPO) The Extended European Search Report for Application No. 23833990.7, Oct. 31, 2024 48 Pages.
(Continued)

*Primary Examiner* — Alina A Boutah
(74) *Attorney, Agent, or Firm* — Anova Law Group, PLLC

(57) ABSTRACT

A non-transitory computer-readable storage medium stores a program that, when executed by a processor, causes the processor to perform a method for binding a plurality of electrical devices. The method includes obtaining a data carrier image, processing the data carrier image to obtain identity identifiers of the plurality of electrical devices, and associating user account information in an application with the identity identifiers of the plurality of electrical devices to bind the user account information and the plurality of electrical devices.

18 Claims, 3 Drawing Sheets

(51) Int. Cl.

| | |
|---|---|
| *H04L 9/40* | (2022.01) |
| *H04L 67/141* | (2022.01) |
| *H04W 12/03* | (2021.01) |
| *H04W 12/50* | (2021.01) |

(58) Field of Classification Search

CPC ....... H04L 63/083; H04L 9/40; H04L 67/141; H04W 12/50; H04W 12/03; H04W 12/06; H04W 12/068; H04W 84/12; H04W 84/18; H04W 8/18; H04W 48/16; H04W 76/10; G06F 21/73

See application file for complete search history.

(56) References Cited

U.S. PATENT DOCUMENTS

| | | | | |
|---|---|---|---|---|
| 2010/0325707 | A1 * | 12/2010 | Iverson | H04L 63/1433 |
| | | | | 726/6 |
| 2016/0171486 | A1 | 6/2016 | Wagner et al. | |
| 2016/0277205 | A1 * | 9/2016 | Liu | H04W 76/10 |
| 2017/0048901 | A1 * | 2/2017 | Finch | H04W 12/06 |
| 2017/0344321 | A1 | 11/2017 | Li et al. | |
| 2019/0357023 | A1 | 11/2019 | Park | |
| 2019/0373433 | A1 * | 12/2019 | Gabriele | H04B 17/318 |
| 2021/0127261 | A1 | 4/2021 | Helms | |
| 2022/0104674 | A1 * | 4/2022 | Xie | A47L 11/24 |
| 2022/0417723 | A1 * | 12/2022 | Hahm | H04W 76/14 |
| 2023/0059126 | A1 * | 2/2023 | Arling | H04L 12/2807 |
| 2025/0088415 | A1 * | 3/2025 | Jin | H04L 12/28 |

FOREIGN PATENT DOCUMENTS

| | | | | | |
|---|---|---|---|---|---|
| CN | 106357653 | A | * | 1/2017 | H04L 63/0815 |
| CN | 108199932 | A | * | 6/2018 | H04L 63/10 |
| CN | 106059837 | B | | 4/2019 | |
| CN | 109587016 | A | * | 4/2019 | H04L 12/2807 |
| CN | 110505629 | A | * | 11/2019 | H04W 48/16 |
| CN | 111246539 | A | * | 6/2020 | H04L 12/2807 |
| CN | 112152853 | A | | 12/2020 | |
| CN | 113273151 | A | * | 8/2021 | H04L 9/40 |
| CN | 114900385 | A | | 8/2022 | |
| CN | 115622826 | A | * | 1/2023 | H04L 12/2803 |
| EP | 3386153 | A1 | * | 10/2018 | H04L 12/2803 |
| EP | 3598358 | A1 | | 1/2020 | |
| RU | 2648971 | C2 | | 3/2018 | |
| WO | WO-2020133495 | A1 | * | 7/2020 | H04L 9/40 |
| WO | WO-2021249060 | A1 | * | 12/2021 | H04L 41/00 |
| WO | 2022051905 | A1 | | 3/2022 | |
| WO | WO-2022213749 | A1 | * | 10/2022 | A47L 11/40 |
| WO | WO-2022261451 | A1 | * | 12/2022 | H04M 1/72412 |

OTHER PUBLICATIONS

Patent Office of the Russian Federation Office Action for Application No. 2024106946/07(015335) Sep. 3, 2024 12 pages (including translation).

The World Intellectual Property Organization (WIPO) International Search Report and Written Opinion for PCT/CN2023/114954 Dec. 18, 2023 13 Pages (including translation).

Federal Service for Intellectual Property of the Russian Federation The Substantive examination for application No. 2024106946/07(015335) Jan. 16, 2025 10 Pages (including translation).

Federal Service for Intellectual Property of the Russian Federation The Notice for granting a patent for an Invention for application No. 2024106946/07(015335) May 22, 2025 14 Pages (including translation).

* cited by examiner

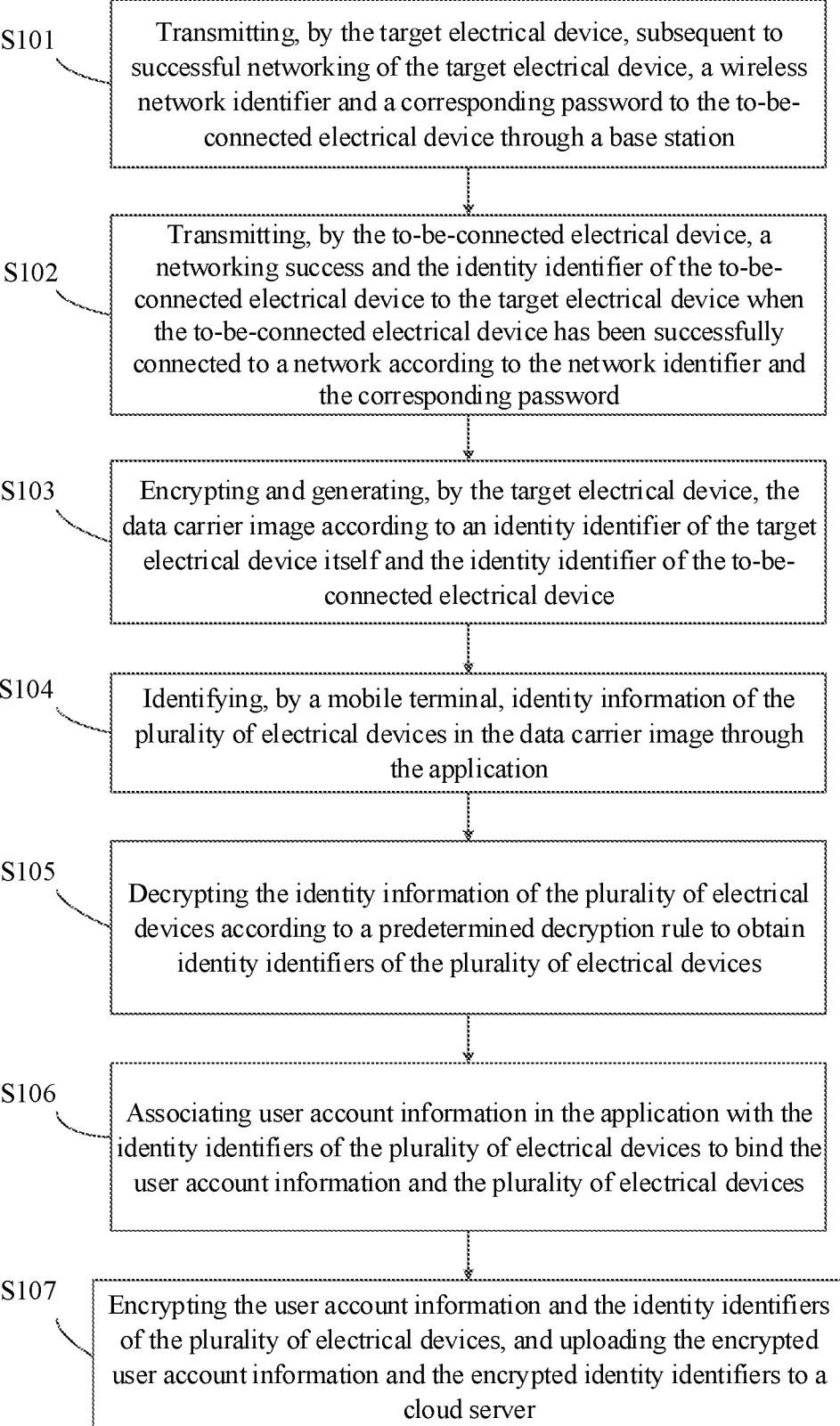

S101 — Transmitting, by the target electrical device, subsequent to successful networking of the target electrical device, a wireless network identifier and a corresponding password to the to-be-connected electrical device through a base station S102 — Transmitting, by the to-be-connected electrical device, a networking success and the identity identifier of the to-be-connected electrical device to the target electrical device when the to-be-connected electrical device has been successfully connected to a network according to the network identifier and the corresponding password S103 — Encrypting and generating, by the target electrical device, the data carrier image according to an identity identifier of the target electrical device itself and the identity identifier of the to-be-connected electrical device S104 — Identifying, by a mobile terminal, identity information of the plurality of electrical devices in the data carrier image through the application S105 — Decrypting the identity information of the plurality of electrical devices according to a predetermined decryption rule to obtain identity identifiers of the plurality of electrical devices S106 — Associating user account information in the application with the identity identifiers of the plurality of electrical devices to bind the user account information and the plurality of electrical devices S107 — Encrypting the user account information and the identity identifiers of the plurality of electrical devices, and uploading the encrypted user account information and the encrypted identity identifiers to a cloud server

FIG. 2

METHOD AND APPARATUS FOR BINDING PLURALITY OF ELECTRICAL DEVICES AND COMPUTER-READABLE STORAGE MEDIUM

CROSS-REFERENCE TO RELATED APPLICATIONS

This application is a National Stage Entry under 35 U.S.C. § 371 of International Application No. PCT/CN2023/114954, filed on Aug. 25, 2023, which claims priority to Chinese Patent Application No. 202211028563.2 filed on Aug. 25, 2022 and entitled "METHOD AND APPARATUS FOR BINDING PLURALITY OF ELECTRICAL DEVICES AND COMPUTER-READABLE STORAGE MEDIUM," the entire contents of both of which are incorporated herein by reference.

FIELD

The present disclosure relates to the technical field of household appliances, and more particularly, to a method for binding a plurality of electrical devices, an apparatus for binding a plurality of electrical devices, a computer-readable storage medium, and a household appliance.

BACKGROUND

With the continuous development of communication technology, household appliances are becoming increasingly intelligent. In order to achieve a better usage experience of a user, binding to the household appliance is realized through network access of the household appliance and by a user through a mobile phone. In this way, controlling on the household appliance is performed to achieve more intelligent functions. However, during the binding to the household appliance, the user needs to perform repetitive operations for binding the household appliances in sequence. Therefore, the operation is tedious, resulting in a poor user experience.

SUMMARY

The present disclosure aims to solve one of the technical problems in the related art at least to some extent. To this end, a first objective of the present disclosure is to provide a method for binding a plurality of electrical devices. By processing a data carrier image, user account information can be bound to the plurality of electrical devices simultaneously. Therefore, a problem of tedious operations for many times is solved. Moreover, device binding efficiency and a user experience are improved.

A second objective of the present disclosure is to provide an apparatus for binding a plurality of electrical devices.

A third objective of the present disclosure is to provide a computer-readable storage medium.

A fourth objective of the present disclosure is to provide a household appliance.

To achieve the above objectives, embodiments of a first aspect of the present disclosure provide a method for binding a plurality of electrical devices. The method includes: obtaining a data carrier image; processing the data carrier image to obtain identity identifiers of the plurality of electrical devices; and associating user account information in an application with the identity identifiers of the plurality of electrical devices to bind the user account information and the plurality of electrical devices.

For the method for binding the plurality of electrical devices according to the embodiments of the present disclosure, firstly, the identity identifiers of the plurality of electrical devices are obtained by obtaining the data carrier image and processing the data carrier image. Then, the user account information in the application is associated with the identity identifiers of the plurality of electrical devices, to bind the user account information and the plurality of electrical devices. Therefore, the method can bind the user account information and the plurality of electrical devices simultaneously through processing the data carrier image. In this way, the problem that multiple operations are tedious is solved. In addition, the device binding efficiency is improved, and the user experience is improved.

In addition, the method for binding the plurality of electrical devices according to the above embodiments of the present disclosure may further have the following additional technical features.

According to an embodiment of the present disclosure, said processing the data carrier image includes: identifying identity information of the plurality of electrical devices in the data carrier image; and decrypting the identity information of the plurality of electrical devices according to a predetermined decryption rule.

According to an embodiment of the present disclosure, the method for binding the plurality of electrical devices further includes, subsequent to completing the binding of the user account information and the plurality of electrical devices: encrypting the user account information and the identity identifiers of the plurality of electrical devices, and uploading the encrypted user account information and the encrypted identity identifiers to a cloud server.

According to an embodiment of the present disclosure, the predetermined decryption rule corresponds to an encryption rule of the identity information of the plurality of electrical devices.

According to an embodiment of the present disclosure, the data carrier image is a dynamic image; and the method further includes, when the user account information fails to be bound to the plurality of electrical devices: prompting a user that the binding fails, and updating the data carrier image.

According to an embodiment of the present disclosure, the data carrier image includes one of a one-dimensional code image, a two-dimensional code image, and a radio-frequency tag image.

According to an embodiment of the present disclosure, the plurality of electrical devices includes a target electrical device and at least one to-be-configured electrical device; and said obtaining the data carrier image includes: transmitting, subsequent to successful network-configuration of the target electrical device, a wireless network identifier and a corresponding password to the to-be-configured electrical device through a base station; transmitting a network-configuration success and the identity identifier of the to-be-configured electrical device to the target electrical device when the to-be-configured electrical device has been successfully connected to a network according to the network identifier and the corresponding password; and generating, by the target electrical device, the data carrier image according to an identity identifier of the target electrical device itself and the identity identifier of the to-be-configured electrical device.

According to an embodiment of the present disclosure, the base station and the at least one to-be-configured electrical device perform data interaction through wireless communication or Bluetooth communication; and the target electrical device and the base station perform data interaction through wired communication or wireless communication.

According to an embodiment of the present disclosure, the target electrical device is a laundry treatment device; the to-be-configured electrical device is a sweeper; and the base station is a sweeper base station.

According to an embodiment of the present disclosure, the laundry treatment device is fixedly connected to the sweeper base station; or the sweeper base station is disposed inside the laundry treatment device.

To achieve the above objectives, embodiments of a second aspect of the present disclosure provide an apparatus for binding a plurality of electrical devices. The apparatus includes: an obtaining module configured to obtain a data carrier image; a processing module configured to process the data carrier image to obtain identity identifiers of the plurality of electrical devices; and a binding module configured to associate user account information in an application with the identity identifiers of the plurality of electrical devices to bind the user account information and the plurality of electrical devices.

For the apparatus for binding the plurality of electrical devices according to the embodiments of the present disclosure, the identity identifiers of the plurality of electrical devices are obtained by obtaining the data carrier image through the obtaining module and processing the data carrier image through the processing module. The binding module associates the user account information in the application with the identity identifiers of the plurality of electrical devices to bind the user account information and the plurality of electrical devices. Therefore, the apparatus can bind the user account information and the plurality of electrical devices simultaneously through processing the data carrier image. In this way, the problem that multiple operations are tedious is solved. In addition, the device binding efficiency is improved, and the user experience is improved.

To achieve the above objectives, embodiments of a third aspect of the present disclosure provide a computer-readable storage medium. The computer-readable storage medium has a binding program for a plurality of electrical devices stored thereon. The binding program for the plurality of electrical devices, when executed by a processor, implements the method for binding the plurality of electrical devices as described above.

For the computer-readable storage medium according to the embodiments of the present disclosure, based on the method for binding the plurality of electrical devices as described above, the user account information can be bound to the plurality of electrical devices simultaneously through processing the data carrier image. Therefore, the problem that multiple operations are tedious is solved. In addition, the device binding efficiency is improved, and the user experience is improved.

To achieve the above objectives, embodiments of a fourth aspect of the present disclosure provide a household appliance. The household appliance includes a memory, a processor, and a binding program for a plurality of electrical devices stored on the memory and executable on the processor. The processor, when executing the binding program for the plurality of electrical devices, implements the method for binding the plurality of electrical devices as described above.

For the household appliance according to the embodiments of the present disclosure, based on the method for binding the plurality of electrical devices as described above, the user account information can be bound to the plurality of electrical devices simultaneously through processing the data carrier image. Therefore, the problem that multiple operations are tedious is solved. In addition, the device binding efficiency is improved, and the user experience is improved.

Additional aspects and advantages of the present disclosure will be provided at least in part in the following description, or will become apparent at least in part from the following description, or can be learned from practicing of the present disclosure.

BRIEF DESCRIPTION OF THE DRAWINGS

FIG. 2 is a flowchart of a method for binding a plurality of electrical devices according to an embodiment of the present disclosure.

DETAILED DESCRIPTION

Figure 1:
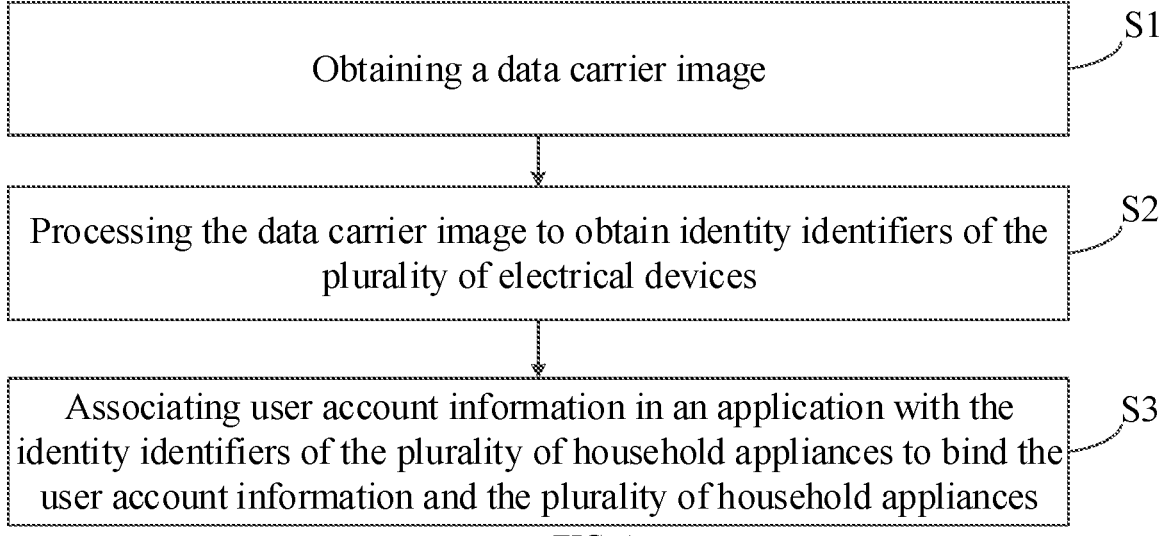
FIG. 1 is a flowchart of a method for binding a plurality of electrical devices according to an embodiment of the present disclosure.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the accompanying drawings are illustrative only, and are intended to explain, rather than limiting the present disclosure.

A method for binding a plurality of electrical devices, an apparatus for binding a plurality of electrical devices, a computer-readable storage medium, and a household appliance according to the embodiments of the present disclosure are described below with reference to the accompanying drawings.

FIG. 1 is a flowchart of a method for binding a plurality of electrical devices according to an embodiment of the present disclosure.

As illustrated in FIG. 1, a method for binding a plurality of electrical devices according to an embodiment of the present disclosure includes the following steps.

At S1, a data carrier image is obtained.

At S2, the data carrier image is processed to obtain identity identifiers of the plurality of electrical devices.

At S3, user account information in an application is associated with the identity identifiers of the plurality of electrical devices to bind the user account information and the plurality of electrical devices.

In an exemplary embodiment of the present disclosure, the data carrier image may be an identifiable two-dimensional code, a barcode, and the like. As an example, the data carrier image is taken as the two-dimensional code. A user accesses an application login interface of a mobile terminal, and then inputs the user account information and a corresponding password. In this way, the account login is successful. Then, the two-dimensional code is scanned and identified through a two-dimensional code identification module, to obtain serial number (SN) codes of a plurality of electrical devices stored in the two-dimensional code. The user may add the identified SN codes of the plurality of electrical devices to the application simultaneously, to complete the binding of the plurality of electrical devices. In this way, the association of the user account information logged in by the application with the SN codes of the plurality of electrical devices is realized. Therefore, according to the method, the binding of the user account information and the plurality of electrical devices can be realized by identifying one data carrier image. As a result, operation steps are reduced. Moreover, account binding efficiency is improved, and a user experience is improved.

It can be understood that after the binding operation of the user account information and the electrical device is completed through the above operations, when the user logs in to the application at another mobile terminal with the user account information, operation states of a plurality of bound electrical devices can be checked and controlled based on the other mobile terminal. Therefore, more intelligent functions are realized.

It should be noted that a number of electrical devices stored in the data carrier image may be set according to actual situations, and a display mode of the electrical devices stored in the data carrier image may also be set according to actual situations, which are not limited herein. For example, the data carrier image may be displayed on a display screen of any electrical device. Only when the electrical device is powered on, the data carrier image is displayed. Otherwise, the data carrier image is not displayed. An identity identifier of the electrical device for displaying the data carrier image is also stored in the data carrier image. In other embodiments of the present disclosure, the data carrier image may also be directly provided on a housing of any electrical device or in an operation manual, which is not limited specifically.

It should be further noted that a storage content of the data carrier image may be set before leaving the factory. For example, before leaving the factory, predetermined identity identifiers of electrical devices in the same series are stored through the data carrier images. In addition, the storage content of the data carrier image may also be self-set and adjusted by the user or set according to an actual application scenario of the electrical device. For example, by granting read and write access rights to specific users, the user may write or delete the storage content of the data carrier image. The foregoing may only be used as an implementation manner of the present disclosure and may be specifically set according to actual situations.

According to an embodiment of the present disclosure, the data carrier image includes one of a one-dimensional code image, a two-dimensional code image, and a radio-frequency tag image.

When the data carrier image is the one-dimensional code image or two-dimensional code image, the data carrier image can be identified by using a scanning identification module of the mobile terminal. Moreover, the stored identity identifiers of the plurality of electrical devices are obtained through data processing. When the data carrier image is the radio-frequency tag image, the mobile terminal may be close to the radio-frequency tag image, radio-frequency information is transmitted by a built-in reader of the mobile terminal. After the radio-frequency tag image enters a recognizable range of the reader, the radio-frequency signal transmitted by the reader is received. In addition, the information stored in the radio-frequency tag image is transmitted through energy obtained by an induced current, i.e., the identity identifiers of the plurality of electrical devices stored in the radio-frequency tag image are identified.

According to an embodiment of the present disclosure, the operation of processing the data carrier image includes:

identifying identity information of the plurality of electrical devices in the data carrier image; and decrypting the identity information of the plurality of electrical devices according to a predetermined decryption rule.

According to an embodiment of the present disclosure, the predetermined decryption rule corresponds to an encryption rule of the identity information of the plurality of electrical devices.

In an exemplary embodiment of the present disclosure, the corresponding data carrier image is obtained by performing encryption processing on the identity identifiers of the plurality of electrical devices. Therefore, when the user processes the data carrier image through the application of the mobile terminal, the identity information of the plurality of electrical devices in the data carrier image is first identified. Then, the identified identity information is decrypted through the predetermined decryption rule corresponding to the encryption processing, to obtain the identity identifier of each electrical device, to improve identification safety.

According to an embodiment of the present disclosure, the method for binding the plurality of electrical devices further includes, subsequent to completing the binding of the user account information and the plurality of electrical devices: encrypting the user account information and the identity identifiers of the plurality of electrical devices, and uploading the encrypted user account information and the encrypted identity identifiers to a cloud server.

That is, after the binding of the user account information logged in by the application and the plurality of electrical devices is completed, the user account information and the SN codes of the plurality of bound electrical devices are encrypted, and then uploaded to the cloud server for storage.

According to an embodiment of the present disclosure, the data carrier image is a dynamic image. The method for binding the plurality of electrical devices further includes, when the user account information fails to be bound to the plurality of electrical devices: prompting a user that the binding fails, and updating the data carrier image.

In an exemplary embodiment of the present disclosure, a SN code of a washing machine and a SN code of a sweeper are stored in the data carrier image. As an example, the data carrier image is a two-dimensional code image displayed on a display screen of the washing machine. When the application identifies the two-dimensional code image, but the user account information fails to be bound to the washing machine and the sweeper, the application transmits a prompt of binding failure, and feeds back a binding failure signal to the washing machine. After the washing machine receives the binding failure signal, the SN code of the washing machine and the SN code of the sweeper are encrypted to re-generate a new two-dimensional code image. The user re-identifies the regenerated two-dimensional code image through the application to execute the binding operation.

It can be understood that the reason why the binding fails may be that the application cannot identify the data carrier image, or the identity identifier of the electrical device obtained after the application identification is a blank, a messy code, and the like. In order to avoid invalid operations for many times, a predetermined number of times of updating the data carrier image may be predetermined. After a number of updates in the current binding operation of the data carrier image reaches the predetermined number of updates, it is determined that this binding operation fails, and the data carrier image is no longer updated.

According to an embodiment of the present disclosure, the plurality of electrical devices includes a target electrical device and at least one to-be-configured electrical device.

The operation of obtaining the data carrier image includes: transmitting, subsequent to successful network-configuration of the target electrical device, a wireless network identifier and a corresponding password to the to-be-configured electrical device through a base station; transmitting a network-configuration success and the identity identifier of the to-be-configured electrical device to the target electrical device when the to-be-configured electrical device has been successfully connected to a network according to the network identifier and the corresponding password; and generating, by the target electrical device, the data carrier image according to an identity identifier of the target electrical device itself and the identity identifier of the to-be-configured electrical device.

In an exemplary embodiment of the present disclosure, before the data carrier image is obtained, firstly, the target electrical device performs communication with the base station, and the base station performs communication with the to-be-configured electrical device. A communication manner may be wired communication or wireless communication, and may be specifically set according to actual situations. In an exemplary embodiment of the present disclosure, as an example, the target electrical device is a washing machine having a display screen, the to-be-configured electrical device is a sweeper, and the base station is a sweeper base station. After the washing machine is powered on and successfully connected to a network according to a searched router's SSID and corresponding WiFi password, the washing machine transmits the router's SSID and corresponding WiFi password to the sweeper base station. The sweeper base station forwards the router's SSID and WiFi password to the sweeper. The sweeper receives the router's SSID and WiFi password and executes a network-configuration operation. After the sweeper succeeds in connecting to a network according to the received router's SSID and WiFi password, network-configuration success information and the SN code of the sweeper are transmitted back to the sweeper base station. Moreover, the network-configuration success information and the SN code of the sweeper are forwarded to the washing machine through the sweeper base station. In this way, the washing machine determines that the sweeper completes network-configuration. Then, the washing machine encrypts the SN code of the washing machine itself and the received SN code of the sweeper to generate a data carrier image, and display the data carrier image through the display screen of the washing machine. At this time, the data carrier image may identify and obtain the SN code of the washing machine and the SN code of the sweeper. It should be noted that, when the sweeper completes network-configuration according to the received router's SSID and WiFi password, i.e., after the sweeper and the washing machine are connected to the same network, except for transmitting the network-configuration success information and the SN code of the sweeper to the washing machine through the sweeper base station, the sweeper may also directly transmit the network-configuration success information and the SN code of the sweeper to the washing machine through the accessed network, which is not limited herein.

In addition, it should be noted that a number of the target electrical devices, a number of the base stations, and a number of the to-be-configured electrical devices may also be set according to actual situations and are not limited specifically. For example, the number of base stations may have a one-to-one correspondence with the number of to-be-configured electrical devices. In addition, after the network-configuration of the target electrical device is completed, the network identifier and the corresponding password can be forwarded through the base station to the plurality of to-be-configured electrical devices. Meanwhile, the plurality of to-be-configured electrical devices is allowed to complete network-configuration. Moreover, after it is determined that the to-be-configured electrical device has been successfully connected to a network, the target electrical device generates the data carrier image for the identity identifiers of the target electrical device and the identity identifiers of the plurality of to-be-configured electrical devices for subsequent binding operations.

In addition, before obtaining the data carrier image, firstly, the target electrical device performs communication with the base station, and the base station performs communication with the to-be-configured electrical device. The communication manner may be wired communication or wireless communication, and may be specifically set according to actual situations. In an embodiment of the present disclosure, the base station and the at least one to-be-configured electrical device perform data interaction through wireless communication or Bluetooth communication; and the target electrical device and the base station perform data interaction through wired communication or wireless communication, i.e., there may be a plurality of to-be-configured electrical devices.

The target electrical device and the to-be-configured electrical device may be set according to actual situations. In an embodiment of the present disclosure, the target electrical device is a laundry treatment device. The to-be-configured electrical device is a sweeper. The base station is a sweeper base station. The laundry treatment device may be a washing machine, a dryer, a clothing care cabinet, and the like.

In an exemplary embodiment of the present disclosure, as an example, a method for obtaining the data carrier image is described by using the to-be-configured electrical device as a sweeper, the target electrical device as a washing machine, and the base station as a sweeper base station. There are three sweepers, which are a sweeper A, a sweeper B, and a sweeper C, respectively. Firstly, after the washing machine completes network-configuration based on the wireless network identifier and the corresponding password, the wireless network identifier and the corresponding password are transmitted to the sweeper base station through wireless communication or wireless communication. The sweeper base station forwards the received wireless network identifier and corresponding password to the sweeper A, sweeper B, and sweeper C through wireless communication or Bluetooth communication. The sweeper A, sweeper B, and sweeper C complete network-configuration according to the received wireless network identifier and corresponding password, and forward the network-configuration success information and the identity identifier information to the washing machine through the sweeper base station. The washing machine encrypts the SN code of the washing machine itself and the received SN codes of the sweeper A, sweeper B, and sweeper C to generate the data carrier image, and displays the data carrier image through the display screen of the washing machine.

It should be further noted that one or more base stations may be provided, which may be set according to actual situations.

According to an embodiment of the present disclosure, the laundry treatment device is fixedly connected to the sweeper base station; or the sweeper base station is disposed inside the laundry treatment device. That is to say, the sweeper base stations may be disposed outside the laundry treatment device and fixedly connected to the laundry treatment device through a connection line to perform data interaction. In addition, the sweeper base station may also be disposed inside a housing of the laundry treatment device and connected to the laundry treatment device through an internal connection line.

As a specific embodiment of the present disclosure, as illustrated in FIG. 2, the method for binding the plurality of electrical devices may include the following steps.

At S101, the target electrical device transmits, subsequent to successful network-configuration of the target electrical device, a wireless network identifier and a corresponding password to the to-be-configured electrical device through a base station.

At S102, the to-be-configured electrical device transmits a network-configuration success and the identity identifier of the to-be-configured electrical device to the target electrical device when the to-be-configured electrical device has been successfully connected to a network according to the network identifier and the corresponding password.

At S103, the target electrical device encrypts and generates the data carrier image according to an identity identifier of the target electrical device itself and the identity identifier of the to-be-configured electrical device.

At S104, a mobile terminal identifies identity information of the plurality of electrical devices in the data carrier image through the application.

At S105, the identity information of the plurality of electrical devices is decrypted according to a predetermined decryption rule to obtain identity identifiers of the plurality of electrical devices.

At S106, user account information in the application is associated with the identity identifiers of the plurality of electrical devices to bind the user account information and the plurality of electrical devices.

At S107, the user account information and the identity identifiers of the plurality of electrical devices are encrypted, and the encrypted user account information and the encrypted identity identifiers are uploaded to a cloud server.

In conclusion, for the method for binding the plurality of electrical devices according to the embodiments of the present disclosure, the identity identifiers of the plurality of electrical devices are obtained by obtaining the data carrier image first and processing the data carrier image. Then, the user account information in the application is associated with the identity identifiers of the plurality of electrical devices, to bind the user account information and the plurality of electrical devices. Therefore, the method can bind the user account information and the plurality of electrical devices simultaneously through processing the data carrier image. In this way, a problem that multiple operations are tedious is solved. In addition, device binding efficiency is improved, and a user experience is improved.

Corresponding to the above embodiments, the present disclosure further provides an apparatus for binding a plurality of electrical devices.

Figures 3, 4:
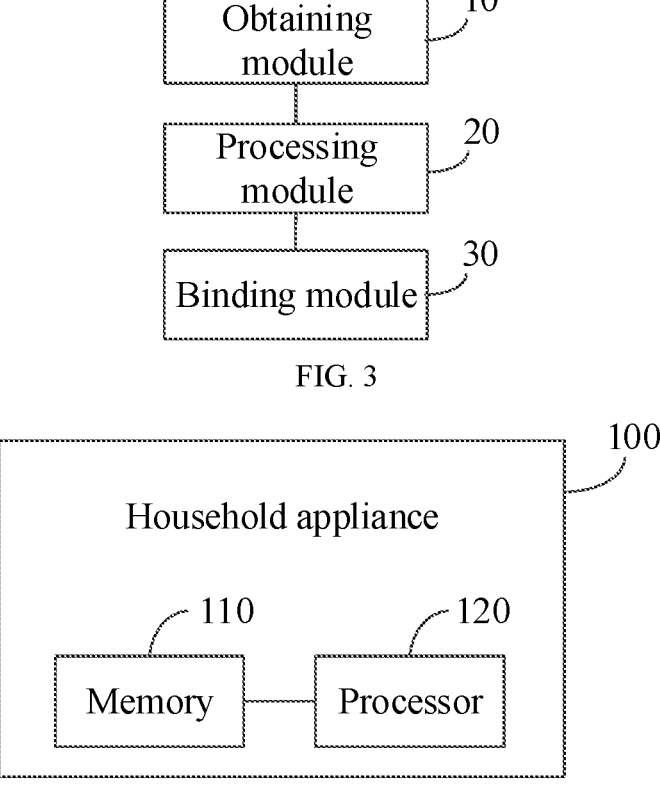
FIG. 3 is a block diagram of an apparatus for binding a plurality of electrical devices according to an embodiment of the present disclosure.
FIG. 4 is a block diagram of a household appliance according to an embodiment of the present disclosure.

As illustrated in FIG. 3, an apparatus for binding a plurality of electrical devices according to the embodiments of the present disclosure may include an obtaining module 10, a processing module 20, and a binding module 30.

The obtaining module 10 is configured to obtain a data carrier image. The processing module 20 is configured to process the data carrier image to obtain identity identifiers of the plurality of electrical devices. The binding module 30 is configured to associate user account information in an application with the identity identifiers of the plurality of electrical devices to bind the user account information and the plurality of electrical devices.

According to an embodiment of the present disclosure, the processing module 20 processes the data carrier image, and is specifically configured to identify identity information of the plurality of electrical devices in the data carrier image and decrypt the identity information of the plurality of electrical devices according to a predetermined decryption rule.

According to an embodiment of the present disclosure, the binding module 30 is further configured to, subsequent to completing the binding of the user account information and the plurality of electrical devices, encrypt the user account information and the identity identifiers of the plurality of electrical devices, and upload the encrypted user account information and the encrypted identity identifiers to a cloud server.

According to an embodiment of the present disclosure, the predetermined decryption rule corresponds to an encryption rule of the identity information of the plurality of electrical devices.

According to an embodiment of the present disclosure, the data carrier image is a dynamic image. When the user account information fails to be bound to the plurality of electrical devices, the binding module 30 is further configured to prompt a user that the binding fails, and update the data carrier image.

According to an embodiment of the present disclosure, the data carrier image includes one of a one-dimensional code image, a two-dimensional code image, and a radio-frequency tag image.

According to an embodiment of the present disclosure, the plurality of electrical devices includes a target electrical device and at least one to-be-configured electrical device. The obtaining module 10 obtains the data carrier image and is specifically configured to: transmit, subsequent to successful network-configuration of the target electrical device, a wireless network identifier and a corresponding password to the to-be-configured electrical device through a base station; transmit a network-configuration success and the identity identifier of the to-be-configured electrical device to the target electrical device when the to-be-configured electrical device has been successfully connected to a network according to the network identifier and the corresponding password; and generate, by the target electrical device, the data carrier image according to an identity identifier of the target electrical device itself and the identity identifier of the to-be-configured electrical device.

According to an embodiment of the present disclosure, the base station and the at least one to-be-configured electrical device perform data interaction through wireless communication or Bluetooth communication; and the target electrical device and the base station perform data interaction through wired communication or wireless communication.

According to an embodiment of the present disclosure, the target electrical device is a laundry treatment device; the to-be-configured electrical device is a sweeper; and the base station is a sweeper base station.

According to an embodiment of the present disclosure, the laundry treatment device is fixedly connected to the sweeper base station; or the sweeper base station is disposed inside the laundry treatment device.

It should be noted that, for details not disclosed in the apparatus for binding the plurality of electrical devices in the embodiments of the present disclosure, reference can be made to the method for binding the plurality of electrical devices according to the embodiments of the present disclosure, and details are omitted herein.

For the apparatus for binding the plurality of electrical devices according to the embodiments of the present disclosure, the identity identifiers of the plurality of electrical devices are obtained by obtaining the data carrier image through the obtaining module and processing the data carrier image through the processing module. The binding module associates the user account information in the application with the identity identifiers of the plurality of electrical devices to bind the user account information and the plurality of electrical devices. Therefore, the apparatus can bind the user account information and the plurality of electrical devices simultaneously through processing the data carrier image. In this way, the problem that multiple operations are tedious is solved. In addition, the device binding efficiency is improved, and the user experience is improved.

Corresponding to the above embodiments, the present disclosure further provides a computer-readable storage medium.

The computer-readable storage medium according to the embodiments of the present disclosure has a binding program for a plurality of electrical devices stored thereon. The binding program for the plurality of electrical devices, when executed by a processor, implements the method for binding the plurality of electrical devices as described above.

For the computer-readable storage medium according to the embodiments of the present disclosure, based on the method for binding the plurality of electrical devices as described above, the user account information can be bound to the plurality of electrical devices simultaneously through processing the data carrier image. Therefore, the problem that multiple operations are tedious is solved. In addition, the device binding efficiency is improved, and the user experience is improved.

Corresponding to the above embodiments, the present disclosure further provides a household appliance.

As illustrated in FIG. 4, the household appliance 100 according to the embodiments of the present disclosure includes a memory 110, a processor 120, and a binding program for a plurality of electrical devices stored on the memory 110 and executable on the processor 120. The processor 120, when executing the binding program for the plurality of electrical devices, implements the method for binding the plurality of electrical devices as described above.

For the household appliance according to the embodiments of the present disclosure, based on the method for binding the plurality of electrical devices as described above, the user account information can be bound to the plurality of electrical devices simultaneously through processing the data carrier image. Therefore, the problem that multiple operations are tedious is solved. In addition, the device binding efficiency is improved, and the user experience is improved.

It should be noted that the logic and/or step described in other manners herein or shown in the flowchart, for example, a particular sequence table of executable instructions for realizing the logical function, may be specifically realized in any computer readable medium to be used by the instruction execution system, device or equipment (such as the system based on computers, the system including processors or other systems capable of obtaining the instructions from the instruction execution system, device and equipment and executing the instructions), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples (non-exhaustive list) of the computer readable medium include but are not limited to: an electronic connection (an electronic device) with one or more wires, a portable computer disk case (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of being printed with programs thereon, this is because, for example, the paper or other appropriate medium may be optically scanned and then edited, decrypted or processed with other appropriate methods when necessary to obtain the programs in an electric manner, and then the programs may be stored in the computer memory.

It should be understood that each part of the present disclosure may be realized by the hardware, software, firmware or their combination. In the above implementations, more steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In the description of this specification, descriptions with reference to the terms "an embodiment," "some embodiments," "examples," "specific examples," or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include at least one of the features. In the description of the present disclosure, "plurality of" means at least two, such as two, three, etc., unless otherwise specifically indicated.

In the present disclosure, unless otherwise clearly specified and limited, terms such as "install," "connect," "connect to," "fix" and the like should be understood in a broad sense. For example, unless otherwise clearly specified and limited, it may be a fixed connection or a detachable connection or connection as one piece; mechanical connection or electrical connection or communication; direct connection or indirect connection through an intermediate; internal communication of two components or the interaction relationship between two components. For those skilled in the art, the specific meaning of the above-mentioned terms in the present disclosure can be understood according to specific circumstances.

Although the embodiments of the present disclosure have been shown and described above, it can be understood that the above-mentioned embodiments are exemplary and should not be construed as limiting the present disclosure. Those of ordinary skill in the art can make changes, modifications, substitutions and modifications to the above-mentioned embodiments within the scope of the present disclosure.

What is claimed is:

1. A non-transitory computer-readable storage medium storing a program that, when executed by a processor, causes the processor to perform a method for binding a plurality of electrical devices including:

obtaining a data carrier image;

processing the data carrier image to obtain identity identifiers of the plurality of electrical devices; and associating user account information in an application with the identity identifiers of the plurality of electrical devices to bind the user account information and the plurality of electrical devices;

wherein:

the plurality of electrical devices include a target electrical device and a to-be-configured electrical device;

obtaining the data carrier image includes:

transmitting, after successful network-configuration of the target electrical device, a wireless network identifier and a corresponding password to the to-be-configured electrical device through a base station, for the to-be-configured electrical device to transmit a network-configuration success and the identity identifier of the to-be-configured electrical device to the target electrical device in response to network-configuration of the to-be-configured electrical device being successfully performed according to the network identifier and the corresponding password; and causing the target electrical device to generate the data carrier image according to the identity identifier of the target electrical device and the identity identifier of the to-be-configured electrical device; and the target electrical device is one of a laundry treatment device and a sweeper, and the to-be-configured electrical device is another one of the laundry treatment device and the sweeper.

2. The storage medium according to claim 1, wherein processing the data carrier image includes:

identifying identity information of the plurality of electrical devices in the data carrier image; and decrypting the identity information of the plurality of electrical devices according to a predetermined decryption rule.

3. The storage medium according to claim 2, wherein the method further includes, after the user account information and the plurality of electrical devices are bound:

encrypting the user account information and the identity identifiers of the plurality of electrical devices; and uploading the encrypted user account information and the encrypted identity identifiers to a cloud server.

4. The storage medium according to claim 2, wherein the predetermined decryption rule corresponds to an encryption rule of the identity information of the plurality of electrical devices.

5. The storage medium according to claim 1, wherein:

the data carrier image is a dynamic image; and the method further includes, in response to the user account information failing to be bound to the plurality of electrical devices:

prompting a user that the binding fails; and updating the data carrier image.

6. The storage medium according to claim 1, wherein the data carrier image includes one of a one-dimensional code image, a two-dimensional code image, and a radio-frequency tag image.

7. The storage medium according to claim 1, wherein:

the base station and the to-be-configured electrical device perform data interaction through wireless communication or Bluetooth communication; and the target electrical device and the base station perform data interaction through wired communication or wireless communication.

8. The storage medium according to claim 1, wherein:

the target electrical device is the laundry treatment device;

the to-be-configured electrical device is the sweeper; and the base station is a sweeper base station.

9. The storage medium according to claim 8, wherein:

the laundry treatment device is fixedly connected to the sweeper base station; or the sweeper base station is disposed inside the laundry treatment device.

10. The storage medium according to claim 1, wherein the data carrier image includes a radio-frequency tag image.

11. The storage medium according to claim 1, wherein the identity identifiers of the plurality of electrical devices including serial number (SN) codes of the plurality of electrical devices.

12. A household appliance comprising:

a memory storing a program;

a processor configured to execute the program to implement a method for binding a plurality of electrical devices, the plurality of electrical devices including a target electrical device and a to-be-configured electrical device, and the method including:

obtaining a data carrier image, including:

transmitting, after successful network-configuration of the target electrical device, a wireless network identifier and a corresponding password to the to-be-configured electrical device through a base station, for the to-be-configured electrical device to transmit a network-configuration success and the identity identifier of the to-be-configured electrical device to the target electrical device in response to network-configuration of the to-be-configured electrical device being successfully performed according to the network identifier and the corresponding password; and causing the target electrical device to generate the data carrier image according to the identity identifier of the target electrical device and the identity identifier of the to-be-configured electrical device;

processing the data carrier image to obtain identity identifiers of the plurality of electrical devices; and associating user account information in an application with the identity identifiers of the plurality of electrical devices to bind the user account information and the plurality of electrical devices;

wherein the target electrical device is one of a laundry treatment device and a sweeper, and the to-be-configured electrical device is another one of the laundry treatment device and the sweeper.

13. The household appliance according to claim 12, wherein processing the data carrier image includes:

identifying identity information of the plurality of electrical devices in the data carrier image; and decrypting the identity information of the plurality of electrical devices according to a predetermined decryption rule.

14. The household appliance according to claim 12, wherein:

the data carrier image is a dynamic image; and the method further includes, in response to the user account information failing to be bound to the plurality of electrical devices:

prompting a user that the binding fails; and updating the data carrier image.

15. The household appliance according to claim 12, wherein:

the base station and the to-be-configured electrical device perform data interaction through wireless communication or Bluetooth communication; and the target electrical device and the base station perform data interaction through wired communication or wireless communication.

16. The household appliance according to claim 12, wherein:

the target electrical device is the laundry treatment device;

the to-be-configured electrical device is the sweeper; and the base station is a sweeper base station.

17. The household appliance according to claim 16, wherein:

the laundry treatment device is fixedly connected to the sweeper base station; or the sweeper base station is disposed inside the laundry treatment device.

18. A non-transitory computer-readable storage medium storing a program that, when executed by a processor, causes the processor to perform a method for binding a plurality of electrical devices including:

obtaining a data carrier image;

processing the data carrier image to obtain identity identifiers of the plurality of electrical devices; and associating user account information in an application with the identity identifiers of the plurality of electrical devices to bind the user account information and the plurality of electrical devices;

wherein:

the plurality of electrical devices include a target electrical device and a to-be-configured electrical device;

obtaining the data carrier image includes:

transmitting, after successful network-configuration of the target electrical device, a wireless network identifier and a corresponding password to the to-be-configured electrical device through a base station, for the to-be-configured electrical device to transmit a network-configuration success and the identity identifier of the to-be-configured electrical device to the target electrical device in response to network-configuration of the to-be-configured electrical device being successfully performed according to the network identifier and the corresponding password; and causing the target electrical device to generate the data carrier image according to the identity identifier of the target electrical device and the identity identifier of the to-be-configured electrical device;

the target electrical device is a laundry treatment device;

the to-be-configured electrical device is a sweeper; and the base station is a sweeper base station.

* * * * *